US007224713B2

(12) United States Patent
Partyka

(10) Patent No.: US 7,224,713 B2
(45) Date of Patent: May 29, 2007

(54) TELEMETRY SYSTEM WITH AUTHENTICATION

(76) Inventor: Andrzej Partyka, 370 Finch La., Bedminster, NJ (US) 07921

( * ) Notice: Subject to any disclaimer, the term of this patent is extended or adjusted under 35 U.S.C. 154(b) by 925 days.

(21) Appl. No.: 09/741,411

(22) Filed: Dec. 20, 2000

(65) Prior Publication Data

US 2001/0004375 A1    Jun. 21, 2001

Related U.S. Application Data

(63) Continuation-in-part of application No. 09/057,859, filed on Apr. 9, 1998, now Pat. No. 6,188,715.

(51) Int. Cl.
*H04B 1/00* (2006.01)
(52) U.S. Cl. .................. 375/135; 375/136; 455/500; 455/502
(58) Field of Classification Search ............ 375/132, 375/135, 136, 134, 137; 455/67.11, 67.13, 455/67.7, 76, 115.1, 115.4, 150.1, 151.2, 455/500, 502; 340/870.01, 870.02, 870.03, 340/870.18, 870.06, 870.11, 870.13
See application file for complete search history.

(56) References Cited

U.S. PATENT DOCUMENTS

| 3,609,729 A | 9/1971 | Anderson |
| 4,040,054 A | 8/1977 | Overman |
| 4,435,821 A | 3/1984 | Ito et al. |
| 4,606,041 A | 8/1986 | Kadin |
| 4,612,652 A | 9/1986 | Kadin |
| 4,614,945 A | 9/1986 | Brunius et al. |
| 4,653,068 A | 3/1987 | Kadin |

(Continued)

OTHER PUBLICATIONS

Robert C. Dixon, "Spread Spectrum Systems", Johm Wiley & Sons, 1984 ISBN 0-471-88309-3, pp. 52-54, 217-235.

(Continued)

*Primary Examiner*—Khanh Tran

(57) ABSTRACT

A telemetry system includes many radio transmitters using frequency hopping carriers to intermittently transmit transmissions indicative of status of sensors associated with the transmitters. The transmitters transmit transmissions independently of a receiver receiving the transmissions and independently of each other. The carrier frequency and the time between transmissions are changed according to a frequency-time hopping sequence that is different for each transmitter. The sequences and the resulting frequency ad time hopping are predictable and can be reproduced in the receiver based on the transmitter ID number. The system also includes one or more receivers containing a plurality of memory registers to hold, simultaneously for each transmitter, digital data indicative of (a) expected time and (b) expected frequency of the next transmission occurrence. The data is updated based on the time and the content of the received transmissions. The receiver authenticates the received transmissions by discriminating transmissions received at a wrong frequency and time. In addition, each transmitter encrypts the transmission using a variable encryption key that is varied with each transmission. The key variations are based on the frequency and time hopping sequence and are different for each transmitter. Alternatively, prior to encryption, each transmitter modifies data for transmission, using a modifier that is varied based on the frequency and time hopping sequence that is different for each transmitter. In addition, for faster acquisition and robust operation, the receiver includes and RSSI circuit based on FFT to detect transmitted carrier power at several different frequencies. The receiver also includes one or more frequency selective circuits that are tuned in response to the outputs from FFT and the status of the time and frequency registers.

20 Claims, 7 Drawing Sheets

U.S. PATENT DOCUMENTS

| | | | |
|---|---|---|---|
| RE32,905 E | 4/1989 | Baran | |
| 4,843,638 A | 6/1989 | Walters | |
| 4,862,493 A * | 8/1989 | Venkataraman et al. | 379/106.04 |
| 5,079,768 A | 1/1992 | Flammer | |
| 5,121,407 A | 6/1992 | Partyka et al. | |
| 5,121,408 A | 6/1992 | Cai et al. | |
| 5,179,569 A * | 1/1993 | Sawyer | 375/133 |
| 5,204,855 A | 4/1993 | Bebee et al. | |
| 5,222,142 A * | 6/1993 | Kent | 380/46 |
| 5,287,384 A | 2/1994 | Avery et al. | |
| 5,309,448 A | 5/1994 | Bouloutas et al. | |
| 5,390,166 A | 2/1995 | Rohani et al. | |
| 5,400,246 A | 3/1995 | Wilson et al. | |
| 5,408,506 A | 4/1995 | Mincher et al. | |
| 5,414,731 A | 5/1995 | Antunes et al. | |
| 5,428,602 A | 6/1995 | Kemppainen | |
| 5,428,637 A | 6/1995 | Oliva et al. | |
| 5,436,935 A | 7/1995 | Bernhard et al. | |
| 5,438,329 A | 8/1995 | Gasouniotis et al. | |
| 5,442,659 A | 8/1995 | Bauchot et al. | |
| 5,517,187 A | 5/1996 | Bruwer et al. | |
| 5,532,702 A | 7/1996 | Mintz | |
| 5,546,422 A | 8/1996 | Yokev et al. | |
| 5,548,582 A | 8/1996 | Brajal et al. | |
| 5,553,094 A | 9/1996 | Johnson et al. | |
| 5,586,141 A | 12/1996 | Ashdown et al. | |
| 5,595,342 A * | 1/1997 | McNair et al. | 236/51 |
| 5,610,907 A | 3/1997 | Barrett | |
| 5,657,343 A | 8/1997 | Schilling | |
| 5,659,303 A * | 8/1997 | Adair, Jr. | 340/870.18 |
| 5,668,828 A | 9/1997 | Sanderford, Jr. et al. | |
| 5,719,564 A * | 2/1998 | Sears | 340/870.02 |
| 5,748,100 A | 5/1998 | Gutman et al. | |
| 5,748,103 A * | 5/1998 | Flach et al. | 340/870.07 |
| 5,852,409 A * | 12/1998 | Bell | 340/870.02 |
| 5,854,994 A | 12/1998 | Canada et al. | |
| 5,914,672 A * | 6/1999 | Glorioso et al. | 340/870.02 |
| 5,919,667 A * | 7/1999 | Gage et al. | 435/91.4 |
| 5,937,002 A | 8/1999 | Anderson et al. | |
| 5,956,621 A | 9/1999 | Weiss et al. | |
| 5,960,047 A | 9/1999 | Proctor et al. | |
| 6,018,528 A | 1/2000 | Gitlin et al. | |
| 6,058,137 A | 5/2000 | Partyka | |
| 6,144,693 A | 11/2000 | Tabeta | |
| 6,188,715 B1 | 2/2001 | Partyka | |
| 6,195,018 B1 | 2/2001 | Ragle et al. | |
| 6,222,440 B1 | 4/2001 | Heller | |
| 6,223,048 B1 | 4/2001 | Noll Barreto et al. | |
| 6,333,975 B1 | 12/2001 | Brunn et al. | |
| 6,377,609 B1 | 4/2002 | Brennan, Jr. | |
| 6,389,057 B1 | 5/2002 | Haarsten | |
| 6,463,040 B1 | 10/2002 | Dutta | |
| 6,466,138 B1 | 10/2002 | Partyka | |
| 6,466,608 B1 | 10/2002 | Hong et al. | |
| 6,535,544 B1 | 3/2003 | Partyka | |
| 6,567,459 B1 | 5/2003 | Hakkinen et al. | |
| 6,700,920 B1 | 3/2004 | Partyka | |
| 6,728,293 B1 | 4/2004 | Partyka | |
| 6,731,223 B1 | 5/2004 | Partyka | |
| 6,760,319 B1 | 7/2004 | Gerten et al. | |
| 6,778,521 B1 | 8/2004 | Korpela et al. | |
| 6,870,875 B1 | 3/2005 | Partyka | |
| 6,894,975 B1 | 5/2005 | Partyka | |
| 6,925,105 B1 | 8/2005 | Partyka | |
| 6,967,974 B1 | 11/2005 | Partyka | |
| 2002/0027504 A1 | 3/2002 | Davis et al. | |

OTHER PUBLICATIONS

Marvin K. Simon, et al., "Spread Spectrum Communications", Computer Science Press, 1885. ISBN 0-88175-017-4, vol. 1, pp. 352-358, vol. 3, pp. 386-398.

Don J. Torrieri, "Principles of Secure Communication Systems", Artech House 1985, ISBN 0-89006-139-4. pp. 212-215, 132, 148-150, 134-145, 92-97.

Kamilo Feher, "Digital Communications: microwave applications", Prentice-Hall Inc., 1981, ISBN 0-13-214080-2. pp. 155, 156-161, 163-165.

European Patent Application No. 0 629 098 A2—Bishop.
EP 0651362 A1—Grundig E.M.V—Abstract, Abstract—p. 1.
WO 01/33796 A1—Zeus Wireless—Abstract, Abstract—p. 1.
PCT Publication No. WO 01/84735 A1—Partyka.

* cited by examiner

TELEMETRY SYSTEM WITH AUTHENTICATION

CROSS-REFERENCE TO RELATED APPLICATIONS

This application claims the benefit, and is a continuation-in-part of, U.S. application Ser. No. 09/067,859, filed on Apr. 9, 1998, and entitled "Frequency Hopping System for Intermittent Transmission with Receiver Using Individual Tracking, FFT, and Authentication, now U.S. Patent No. 6,188,715.

FIELD OF THE INVENTION

The present invention relates to telemetry in general, and, more particularly, to a system in which a plurality of transmitters intermittently transmit short messages indicative of status of sensors associated with the transmitters, to a method of synchronization suitable for using frequency hopping carrier in such systems, and to a method of authentication of the received messages.

BACKGROUND OF THE INVENTION

Some wireless telemetry systems (e.g., burglar alarms, fire alarms, power utility meters, leak detectors, environmental monitoring, etc.) comprise many transmitters that periodically or sporadically transmit messages to one or more receivers. In these systems, the transmitters are located at different places and transmit messages that are indicative of the status of monitoring sensors to a receiver that collects the data from all of the sensors. Normally, the transmitters transmit messages that are as short as feasible and with the interval between the transmissions as long as feasible. This is advantageous for two reasons. First, it minimizes the average current drain in the transmitters, which are typically battery operated. Second, short and infrequent transmissions lower the probability that the data is lost due to collisions that occur when two or more transmitters transmit at the same time. However, if an alarm occurs, the associated transmitter transmits immediately in order to convey the alarm message with little delay.

Typically, such systems transmit data at a single frequency, and thus are susceptible to interference and signal loss due to phenomena known as "multipath fading." Consequently, the reliability of such systems is compromised or, conversely, the transmitted power has to be increased to overcome the fading, which results in larger power drain and shorter battery life. Besides, there usually are regulatory limits that restrict such transmitter power and thus limit the possible compensation by sheer increase of power. Since the multipath effect is highly sensitive to the frequency of the transmitted carrier, a system using multiple frequencies (e.g., a frequency hopping spread spectrum system, etc.) has a potential to eliminate these drawbacks. However, frequency hopping systems require a long acquisition time and they are typically used in two way communication applications in which all the devices are continuously synchronizing with one master device or with each other using a variety of synchronization methods as shown in some references. In other cases, to ease the synchronization problem, there are employed receivers that can simultaneously receive signals at many frequencies by making the receiver broadband or by using several receivers at the same time. Generally, those solutions suffer from performance degradation or high cost or both, which makes them undesirable for low cost applications that require high reliability such as security systems and some telemetry systems.

A serious problem that must be addressed in battery operated systems is to shorten the transmission time as much as possible by making the message preamble as short as possible in order to conserve the battery power. Therefore, the synchronization of the receiver with the transmitters is a difficult task. This problem is exacerbated in some systems such as security alarms that require some messages to be conveyed to the system without waiting for the scheduled transmission time. A related problem, in battery operated systems, is limitation of the transmitted power to conserve the battery power.

Many telemetry systems need to be protected from tampering with telemetry data. For example, in a security system, an intruder may attempt to gain access by spoofing the system with false transmissions. It is therefore important to provide for authentication of the transmissions. Similarly, some telemetry systems need to protect data from eves dropping, thus requiring encryption to protect the transmitted data.

SUMMARY OF THE INVENTION

Some embodiments of the present invention comprise a frequency hopping receiver that rapidly acquires and maintains synchronization with a plurality of intermittently transmitting frequency hopping transmitters, which enables the transmitters to omit the transmission of long preambles. This is advantageous because it lowers the average current drain in the transmitters and, consequently, lengthens their battery life. Furthermore, some embodiments of the present invention are advantageous in that they provide improved reliability in the presence of multipath fading, interference and jamming. Still furthermore, some embodiments of the present invention are capable of eliminating the effect of persistent collisions that occur when two or more transmitters transmit at the same time in the same channel for a prolonged period. And still furthermore, some embodiments of the present invention provide for protection of the transmissions from eves dropping and for authentication, i.e. for verification if received messages are valid and were sent from a valid transmitter.

The illustrative embodiment of the present invention is a frequency-hopping wireless telemetry system comprising: (1) one or more receivers, and (2) one or more transmitters, each of which receive input from one or more sensors. The transmitters intermittently transmit very short messages indicative of status of the sensors associated with the transmitters. Each transmitter includes a time interval generator to establish the time interval between successive transmissions, a frequency synthesizer-modulator to generate a modulated radio frequency carrier signal wherein the frequency of the carrier changes in response to programming the synthesizer by digital data, a reference frequency oscillator to provide a frequency reference from which the synthesizer derives carrier frequencies and, advantageously, from which the time interval generator derives its timing, and a transmitter control logic activated in response to pulses from the time interval generator or a sensor signal indicating an abnormal condition. When activated, the transmitter control logic activates and programs the synthesizer so that the transmitter carrier frequency is changed according to a frequency hopping algorithm, provides digital data indicative of the sensor status and advantageously battery status, and modulates the carrier with the provided data. The receiver includes at least one frequency selective radio receiver circuit, programmable by digital data, to receive and demodulate a transmitted carrier when the frequency of the receiver circuit is programmed according to the frequency of the carrier, and a receiver control logic to process demodulated data, to provide system interface responsive to the received messages, and to program the frequency of the frequency selective receiver circuit. The receiver also includes a means to digitize the received signal within the entire band of interest, and a Fast Fourier Transform (FFT) means to transform the sampled signal to produce a plurality of outputs indicative of the power of the frequency components present in the sampled signal. In the illustrative embodiment, the frequency selective radio receiver circuit comprises a frequency converter followed by a low pass filter and a data demodulator to process the transmission frequency channel selected by the frequency converter and to demodulate the received signal. The frequency converter is tuned to a selected transmission frequency channel by the control logic, in part, in response to the processing of the FFT outputs. The control logic includes a receiver timer to measure the elapsing time, and a plurality of memory registers to hold digital data indicative of (a) the time of the next transmission occurrence for each transmitter and (b) the frequency of the next transmission occurrence for each transmitter. In operation, the control logic sequentially compares the data content of the time registers with the data content of the timer and if the transmission is due from a transmitter, the control logic programs the frequency selective radio receiver circuit according to the data content in the frequency register associated with said transmitter, attempts to decode the demodulated signal, modifies the content of the time register by a number representative of the time interval between the successive transmissions for said transmitter and modifies the content of the frequency register according to a predetermined algorithm for said transmitter. This way, a robust operation is obtained: the FFT circuit operating as a multi-channel received signal strength indicator (RSSI) speeds up the acquisition, the controller with its frequency and time registers provides for individual tracking of all the transmitters. In combination, the two mechanisms provide for a very robust operation.

In accordance with the illustrative embodiment of the present invention there is provided a method of transmission in the system so as to improve reliability of the system in the presence of multipath fading and interference, the method is based on varying the transmission frequency for each transmitted message and varying the time between consecutive messages. The frequency variations provide frequency diversity and are effective against multipath fading as well as single of multiple narrowband interference. The time variations are effective against periodic impulse interference. In combination, the frequency and time variations provide immunity for a wide variety of signal impairments and interference including multipath fading, wide and narrowband interference, impulse noise and deliberate jamming.

In accordance with the illustrative embodiment of the present invention there is provided a method of minimizing the effect of collisions, the method is based on selecting the transmission frequencies in sequences that are different for each transmitter, wherein transmitter frequency sequence depends on the transmitter ID number or other number derived or associated with the transmitter ID. In addition, in the illustrative embodiment, the transmitter ID number or other number derived or associated with the transmitter number is included in the transmitted message, so that, upon reception of a single message from a transmitter, the receiver can determine what is the next frequency for this transmitter, and thus achieve synchronization with this transmitter.

In accordance with the illustrative embodiment of the present invention there is provided another method of minimizing the effect of collisions that can be used alone or in conjunction with previously described minimizing of collisions. The method comprises randomizing the time interval between transmissions individually for each transmitter and a receiver compensating for the time interval changes.

In accordance with the illustrative embodiment of the present invention there is provided a simple method to generate a very large number of frequency-time hopping sequences. The method produces sequences that are orthogonal, thus eliminates possibility of persistent collisions even when large number of transmitters are used. In addition, the method requires identical circuit in each transmitter and the actual sequence that is produced is selected by the transmitter ID or other number associated with the transmitter ID, thus making it convenient for manufacturing. Also, the method enables to produce a very large number of frequency-time sequences based on a single short PN generator whose state can be instantly recovered by a receiver based on just one received transmission, thus aiding the receiver in obtaining synchronization with a transmitter whose ID is known. At the same time, because of a very large number of possible sequences that can be generated, it is difficult to obtain synchronization if the transmitter ID is not known, which makes the system immune to interception and jamming.

In accordance with the illustrative embodiment of the present invention there is provided a method that enables such a system to authenticate the received transmissions. The method comprises discriminating the received transmissions based on an expected and actual transmission frequency and time. In addition, the transmitted data is encrypted for each transmission wherein the encryption key is changed for each transmission. Alternatively or in conjunction with the variable encryption key, the transmitted data is modified, prior to the encryption, by a modifier. The variable encryption key and the modifier are derived based on the frequency and time hopping algorithm and can be derived in the receiver without overhead data in the transmissions. The encryption key and/or the modifier are varied according to a sequence that is individually selected by each transmitter based on the transmitter ID code, and is different for each transmitter.

DETAILED DESCRIPTION

Figure 1:
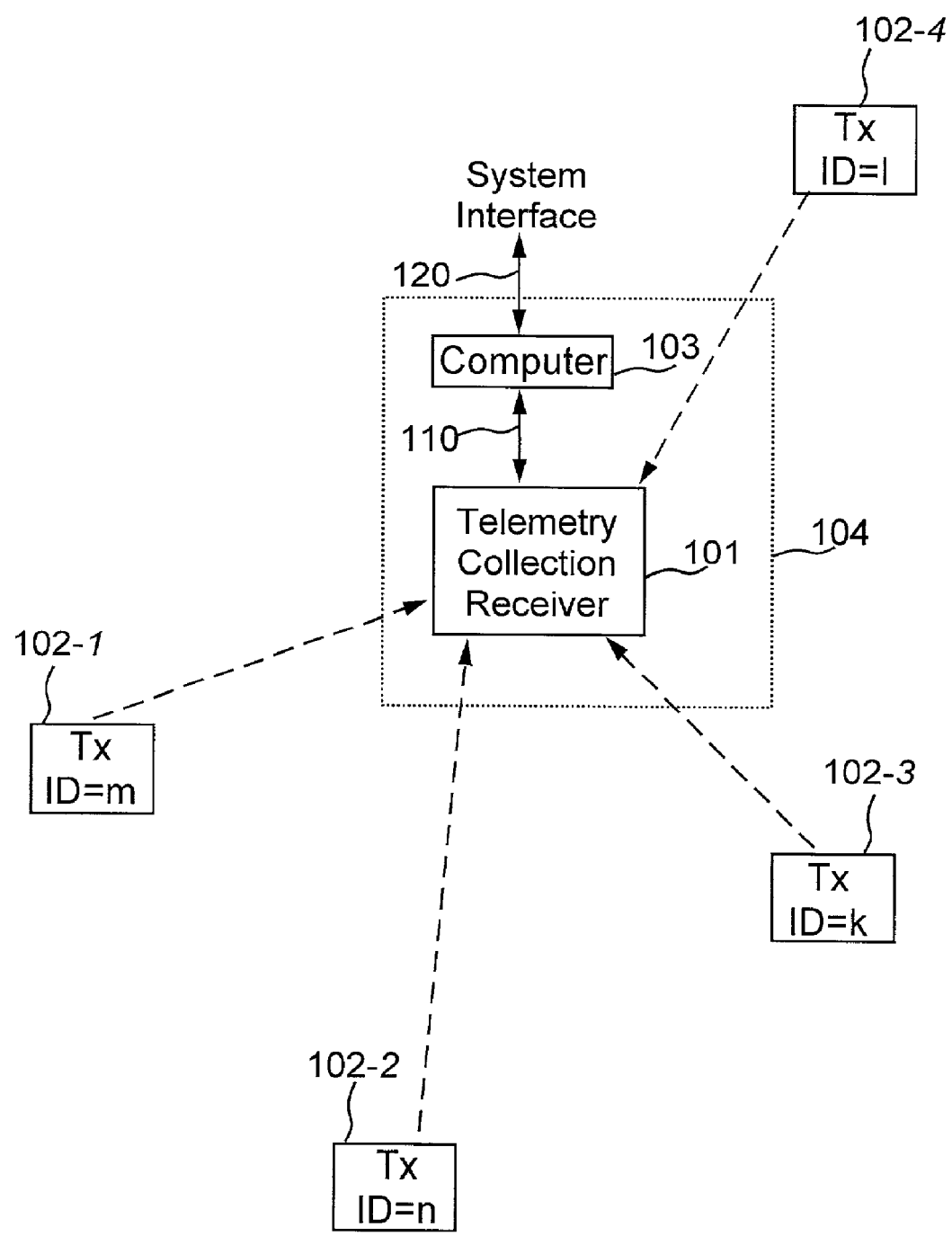
FIG. 1 is a block diagram of an example of an illustrative embodiment of a telemetry frequency hopping system including many transmitters and a receiver.

Referring to FIG. 1, the frequency hopping system includes a telemetry collection unit 104 and a plurality of remote telemetry transmitters (transmitters) 102-1, 102-2, 102-3 and 102-4. The telemetry collection unit includes a telemetry collection receiver (receiver) 101, and a computer 103 that can communicate the telemetry over system interface 120. The receiver 101 includes a receiver interface 110 through which the receiver can be connected, locally or remotely, to a variety of interface equipment, a controller, or a computer. Each remote telemetry transmitter includes an interface or a sensor or an operation to be monitored. Each remote telemetry transmitter intermittently transmits short messages to the telemetry collection receiver. The remote telemetry transmitters are not connected to each other and do not receive messages back from the telemetry collection receiver. The remote telemetry transmitters transmit messages when they need to without any regard to other remote telemetry transmitters, as the remote telemetry transmitters are not synchronized with each other. Each remote telemetry transmitter comprises a transmitter identification (ID) code.

Figure 2:
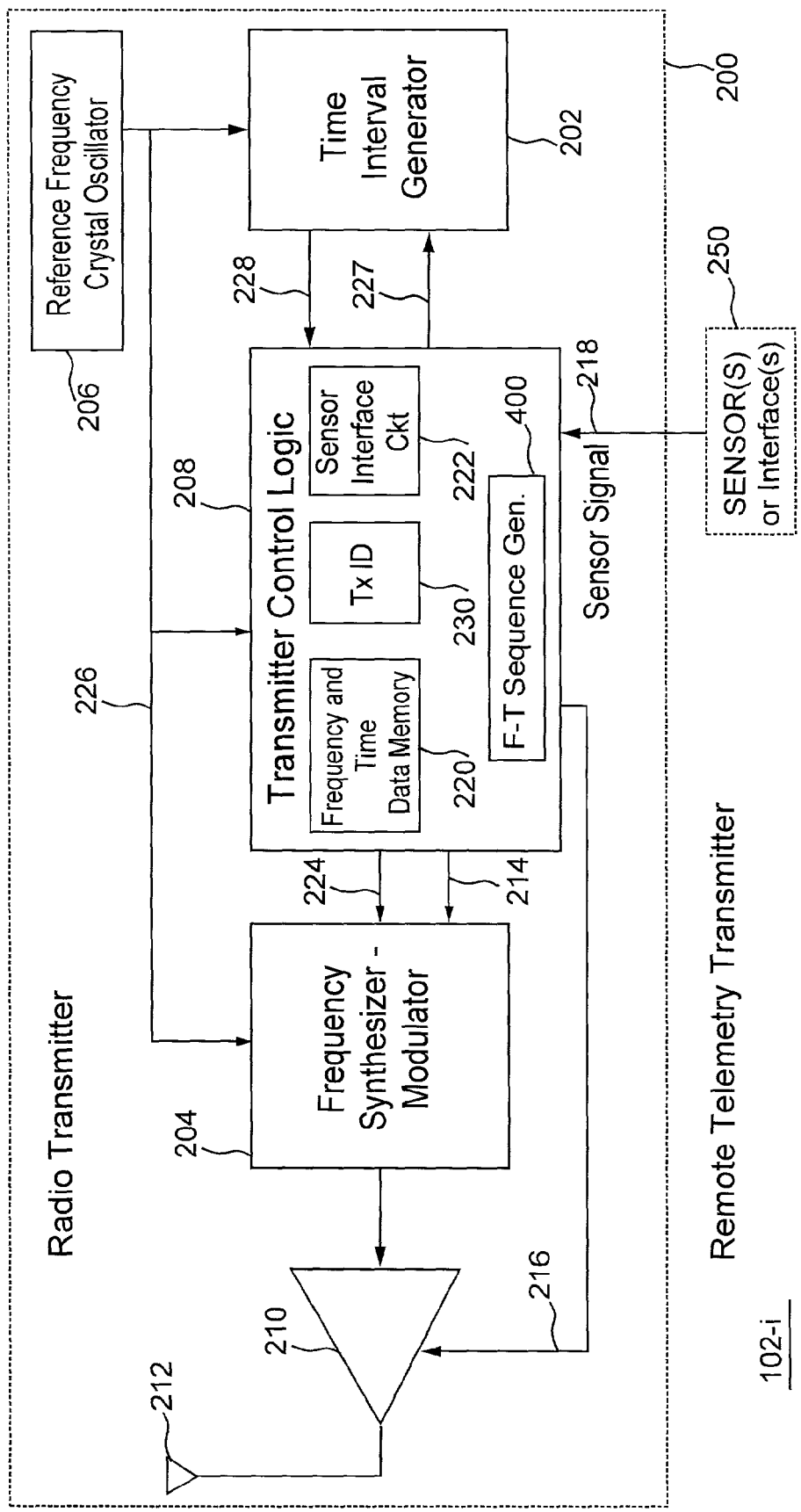
FIG. 2 is a block diagram of a transmitter according to an advantageous embodiment of the present invention.

Referring to FIG. 2, in accordance with the illustrative embodiment of the present invention, the remote telemetry transmitter 102-i includes a radio transmitter (transmitter) 200 including a reference frequency crystal oscillator 206 to produce a stable frequency on line 226, a time interval generator 202 establishing a time base to produce pulses on line 228 activating the transmitter, a frequency synthesizer-modulator circuit 204 to produce a radio frequency carrier modulated by modulation data fed to the synthesizer via line 224 wherein the frequency of the carrier can be varied by programming to a desired value via plurality of lines 214, transmitter control logic 208 to activate and program the synthesizer-modulator circuit 204 via plurality of lines 214 when the logic is activated by a pulse from the time interval generator or by an abnormal signal indication on a sensor signal input 218, an amplifier 210 to amplify the radio carrier provided by the synthesizer when the amplifier is activated by the control logic 208 via line 216, and an antenna 212 to radiate the power delivered by the amplifier. The control logic 208 includes a frequency and time data memory register 220 to hold information used to determine the time and the frequency of next transmission, and a sensor interface circuit 222 to accept the sensor signal and detect an abnormal signal condition, and to convert the sensor signal to a digital format suitable for transmission. The transmitter logic also includes a storage means 230 to store a transmitter identification number to differentiate this transmitter from other transmitters. In addition, the transmitter logic includes a frequency-time sequence generator 400 as described later in details. The transmitter control logic, in some systems, can be realized based on a microprocessor, in some other systems, a specialized component may be used. In the illustrative implementation, the remote telemetry transmitter includes also one or more sensors or sensor interfaces 250 responsive to changes that are to be monitored and to produce appropriate signals at the input 218. However, it should be apparent that such sensor can be an integral part of the transmitter or it can be external part or even a separate module. Furthermore, a part of the sensor may be integrated with the transmitter and another part of the sensor can be external to the transmitter. The signal at the input 218 can represent any measured or sensed effect: e.g., temperature, motion, sound, pressure, switch closure, presence of chemical substance, user input, etc.

In operation, during the time between transmissions, the transmitter is in a standby mode in which the amplifier 210 and synthesizer-modulator 204 are not active and, preferably, the control signals turn off the power from these circuits in order to minimize the standby current of the transmitter. The transmitter control logic 208 is in a standby mode in which most of the circuits are inactive and some or most of the circuitry can be powered down with the exception of the circuits supporting critical functions; (a) the sensor interface circuit 222 that detects an abnormal signal condition and produces a binary signal that is logically combined with the signal on line 228 produced by the time interval generator so that when either a pulse or abnormal condition occurs the rest of the transmit logic circuitry is activated or powered up, (b) the frequency and time data memory 220 that has to retain the data during the period between transmission and consequently either it has to be a nonvolatile type or it has to be powered up during the period between transmissions. Upon activation, the control logic 208 determines the activation source by reading signal on line 228 and input 218.

When the logic 208 is activated by a pulse, on line 228, from the time interval generator the following sequence of events occurs. First, the logic reads the frequency data memory and produces a data packet that includes the sensor status, the transmitter identification number and other data such as battery status. Then, the logic activates and programs the synthesizer-modulator circuit 204, activates the amplifier 210 and sends the packet to the modulator via line 224. After completion of each transmission, the transmitter logic sets the transmitter in the standby mode until activated again by a pulse on line 228 or a sensor abnormal condition indicated on the input 218.

In an advantageous embodiment the transmission of a packet can be repeated a predetermined number of times at separate frequencies, wherein the number of repetitions is chosen according to application needs and, wherein the frequencies are determined by the transmitter logic according to an algorithm described later in details. This way, it is possible for the receiver to receive some repeated packets even if other packets are lost due to frequency selective fading caused by multipath or due to interference.

When a sensor abnormal condition occurs, the sensor interface circuit 222 produces an active level of the signal indicative of the sensor abnormal level which activates the transmitter via a combinatorial logic circuit that combines the sensor abnormal level signal with the pulses from the time interval generator. When activated this way, the transmitter control logic 208 produces a data packet that includes the sensor status, then the logic activates and programs the synthesizer-modulator circuit 204, activates the amplifier 210, and sends the packet to the synthesizer-modulator. The transmission may be repeated many times and the frequency for each transmission may be varied.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence; thus, normal operation is restored.

In the illustrative embodiment, the sequence in which frequencies are used is determined individually for each transmitter. The following is the description how this is accomplished. The frequency hopping sequence generator is based on a pseudo random sequence generator based on a linear feedback shift register, wherein some outputs of a shift register are fed to an EX-OR (Exclusive OR) gate whose output is connected to the shift register input. For a certain combination of the outputs that are fed to the EX-OR gate, the shift register can produce a sequence that has $2^N$-1 bits, wherein N is the length of the shift register. Such a sequence is called a maximum length sequence. Alternatively, if all the outputs of the shift register are taken at a time, then a pseudo random sequence of $2^N$-1 numbers is created, wherein all the numbers are N digits long and each number differs from all the other numbers in the sequence; the numbers range from 1 to $2^N$-1. Such pseudo random generators are known to the skilled in the art. For example, a three-bit PN generator is based on a three-bit shift register with feedback taken from the first and the last bit. This register produces a repetitive sequence of seven numbers, wherein each number has three digits. The numbers change from 1 to 7. The sequence repeats indefinitely with a period $2^N$-1, which for N=3 is equal seven.

Figure 3:
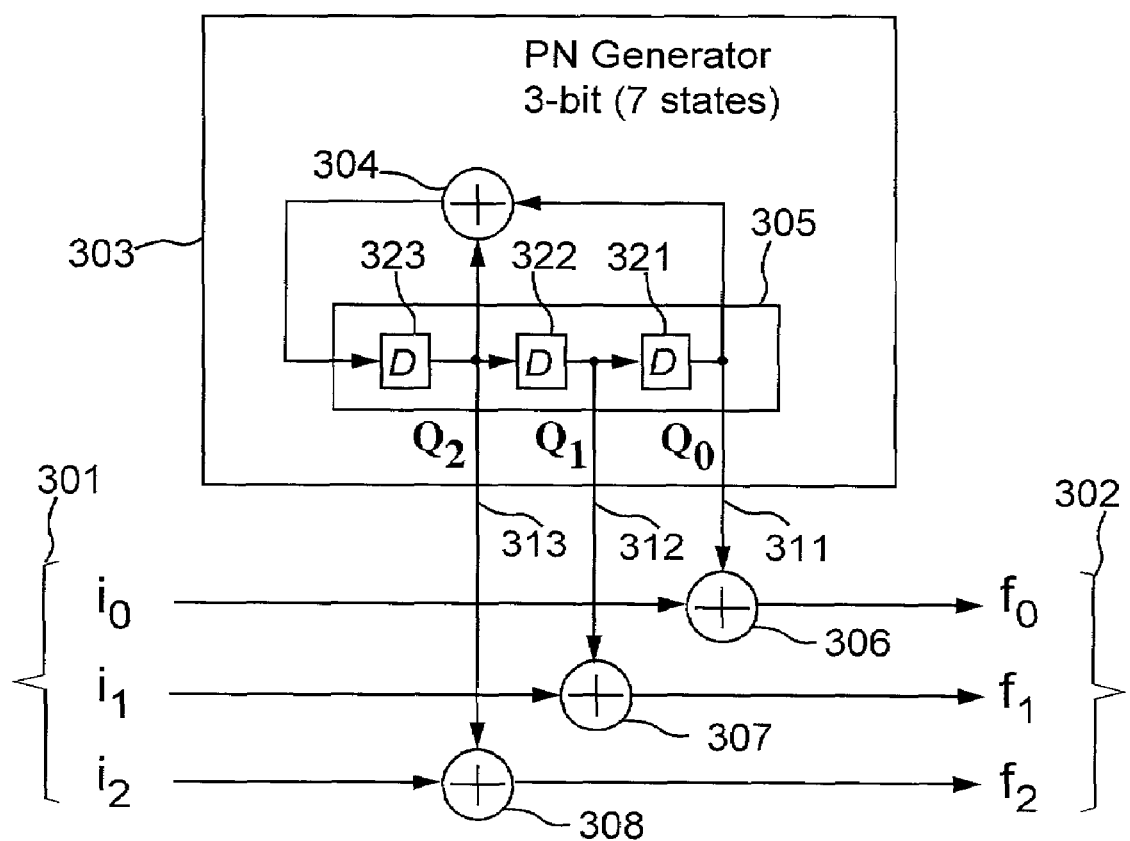
FIG. 3 is a block diagram of an example of an illustrative embodiment of a sequence generator used to determine the individual frequency (or time) sequences.

Referring to FIG. 3, the sequence generator 300 that can be used for determining frequency hopping (or time hopping) comprises pseudo random sequence (PN) generator 303, sequence permutation logic including EX-OR gates 306, 307 and 308, sequence selecting number (permuting number) input 301, and hoping sequence output 302.

The pseudo random sequence generator 303 includes of a shift register 305 and EX-OR gate 304. The shift register 305 is composed of three stages 321, 322, and 323 having three outputs $Q_0$ 311, $Q_1$ 312 and $Q_2$ 313 respectively. The feedback is taken from outputs $Q_0$ and $Q_2$. The three least significant bits of the transmitter identification $\{i_2, i_1, i_0\}$ 301 are combined with the output of the pseudo random sequence generator $\{Q_2, Q_1, Q_0\}$ using EX-OR gates 308, 307, 306. The result can be used to indicate the frequency or frequency channel index $\{f_2, f_1, f_0\}$ 302 over which the transmission will occur.

Assuming that the initial state of the shift register is binary 111 (decimal 7), the produced sequence is $\{7, 3, 5, 2, 1, 4, 6\}$. These numbers are then combined with the last three bits of the transmitter identification using bit by bit EX-OR operation; i.e. the last bit of the transmitter identification ($i_0$) is combined with the last bit of the random number ($Q_0$), etc. This way produced new sequence has numbers ranging from 0 to 7 the order of which depends on the last three bits of the transmitter identification. Thus, 8 distinct (permuted) sequences of numbers are created. These sequences are used to select the transmission frequencies; each number represents an index (frequency index) used to select a frequency. For example, if the last digits of the transmitter identification are 000, then the frequencies are selected in the order $\{7, 3, 5, 2, 1, 4, 6\}$, i.e. the sequence is not altered. If the last three digits of the transmitter identification are 001, then the frequencies are selected in the order $\{6, 2, 4, 3, 0, 5, 7\}$; if the last three digits of the transmitter identification are 010, then the frequencies are selected in the order $\{5, 1, 7, 0, 3, 6, 4\}$; etc.

Note that, each such sequence repeats cyclically as the PN generator output repeats with a period $2^N$-1. The notation $\{7,$ 3, 5, 2, 1, 4, 6$\}$ means that the sequence of numbers as indicated is cyclically repeated.

Notice, that one number is converted into "0" in the process of combining PN generator output with transmitter ID number thus, strictly speaking, the new sequences are not permutations of the original sequence. However, for the purpose of this application, this process is referred to as "permutation" and the resulting sequences as "permuted" as a convenient and adequate description. Notice also, that since some numbers are converted to zero during permutation process, the sequences collectively use $2^N$ numbers (frequencies) not $2^N$-1.

If a longer shift register is used, longer sequences are generated using more frequencies. The sequence length increases exponentially with the increase of the shift register length. For example if the register length is 2-bits, the sequence length is $2^2$-1=3, e.g. the sequence is $\{1, 2, 3\}$ before permutation with the transmitter ID bits; if the register length is 3-bits the sequence length is $2^3$-1=7 as shown above, etc. Preferably, a multiplicity of at least 128 frequencies are used as this is required by Federal Communications Commission to operate in certain frequency bands without a license. In the illustrative embodiment, an 8-bit shift register is used to produce sequences that use 256 distinct frequencies. Each number in the sequence actually represents an index based on which the actual frequency is determined.

Notice, that each number in the sequence is different, i.e. each time the shift register state is changed, the resulting output number is also changed and each number is appears only once in the sequence. This is true regardless of the permuting bits used.

Normally, the time intervals between transmissions are controlled by a quartz crystal and, ideally their nominal values are the same for all transmitters, however in an advantageous embodiment, the time intervals are perturbed by small time increments to further randomize the transmission events and lower the probability of persistent collisions with other transmitters as well as avoiding an intentional or unintentional pulsed interference. The transmitter control logic 208 can accomplish this by programming the time interval generator 202 via line 227 (FIG. 2) according to a predetermined algorithm. The information about the current status of the algorithm may be included in the transmitted packet to aid the receiver operation.

In an illustrative embodiment, the method of determining the time interval perturbation is based on a similar technique as described in conjunction with the frequency index generation. I.e., each time a transmission is performed, a new number is generated and used to determine the time interval between the current and the next transmission. The time variations can be determined by processing the output of the PN generator used for the frequency index with bits of the transmitter ID code (preferably different from the bits used for frequency variations). Advantageously, the same PN generator outputs are utilized, thus making it easier to synchronize the receiver with the time variations.

However, according to the illustrative embodiment of the present invention, the following method is used that not only provides for the time and frequency variations but also provides a great number of orthogonal frequency-time hopping sequences.

Figure 4:
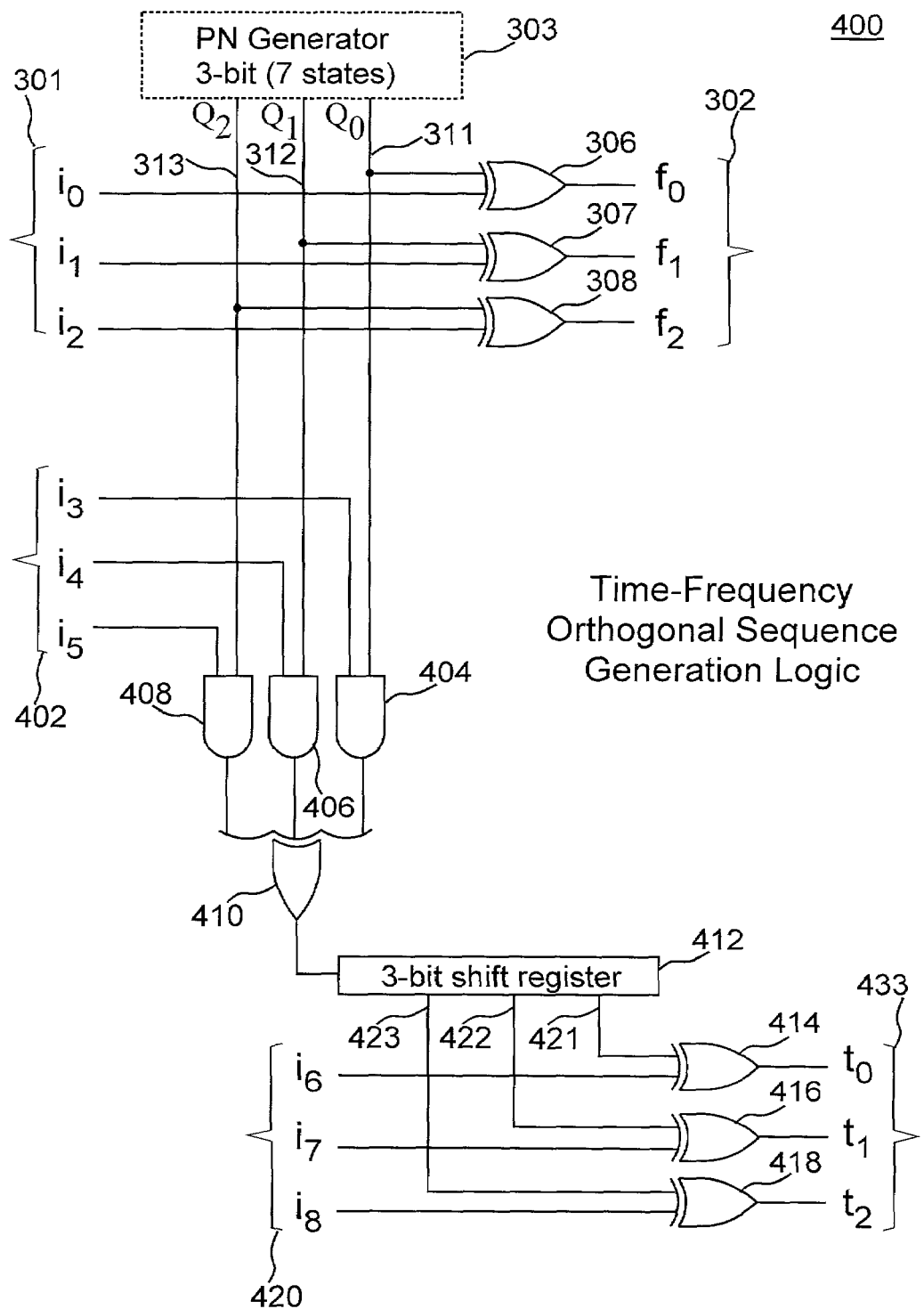
FIG. 4 is a block diagram of an example of an illustrative embodiment of a sequence generator used to determine the individual frequency-time sequences.

Referring to FIG. 4, the frequency index is produced by the PN generator 303 outputs 313, 312 and 311 and transmitter ID bits 301-$\{i_2, i_1, i_0\}$ processed with EXOR gates 308, 307, and 306 to produce index digits 302-$\{f_2, f_1, f_0\}$ as described previously in conjunction with FIG. 3. The PN generator output is further processed with transmitter ID digits 402-{$i_5$, $i_4$, $i_3$} by the AND gates 408, 406 and 404 and by an EXOR gate 410. The output of the gate 410 taken one bit at the time is a shifted replica of the output of the PN generator e.g. output 311 or 312 or 313, whose relative shift depends on the transmitter ID digits 402. The output of the gate 410 is then fed to a shift register 412 whose outputs 423, 422 and 421 are shifted replicas of the PN generator outputs 313, 312, and 311 respectively. When taken three digits at the time, the sequence produced at the output of the shift register is a shifted replica of the output of the PN generator. For example, if the PN sequence produced is {7, 3, 5, 2, 1, 4, 6}, and bits {$i_5$, $i_4$, $i_3$} are 011 then shifted sequence is {4, 6, 7, 3, 5, 2, 1}; if the bits {$i_5$, $i_4$, $i_3$} are 101 then the shifted sequence is {2, 1, 4, 6, 7, 3, 5}. This way, a total of 7 shifted sequences are produced (000 input is not allowed). The shifted sequences are further processed with bits 420-{$i_8$, $i_7$, $i_6$} of the transmitter ID by EXOR gates 418, 416, and 414 to produce permutations of the shifted sequences at the outputs 433-{$t_2$, $t_1$, $t_0$} in a manner similar to the previously described in conjunction with frequency index generation. This way, each shifted sequence can be permuted in 8 different ways creating total 7*8=56 shifted-permuted sequences. The shifted and permuted sequences are used to produce variations of the time between consecutive transmissions. In the illustrative embodiment, the numbers from a sequence are multiplied by a $\Delta T = TBT/P$ and added to the nominal time between transmission. Where, TBT is the nominal time-between-transmission and P is an arbitrary but rather large integer number. Advantageously P is a power of two.

If the permuted PN sequences are used as frequency indexes and the shifted-permuted sequences are used to randomize the time between transmission, then there are created 8*7*8 =448 sequences that are frequency-time orthogonal in the sense that if two sequences coincide at one frequency and time, they will not coincide for any other frequency and time for the entire PN generator period. This is based on merely 3-bit generator of the illustrative example! Of course, if a longer shift register is used for the PN generator, a far greater number of sequences are created. In the illustrative embodiment, an 8-bit generator is used as described previously. This results in over 16E6 orthogonal time-frequency sequences. Enough to relieve the manufacturer and applications from transmitter ID code management other than sequential numbering of all manufactured transmitters. Of course, for a 8 bits shift register, 8 bits of the transmitter ID code are used to obtain sequence permutation for frequency index, similarly, 8 bits are used for shifting and another 8 bits for permuting the shifted sequence to obtain the time delay variations.

One advantage of this method is that in addition to two apparent dimensions of variability present in the form of permutations of frequency and time sequences, there is a third dimension added: i.e. the phase relationship variability between the frequency and time sequences. This rapidly increases a number of distinct orthogonal frequency-time sequences with increasing length of the basic PN generator as evidenced by the illustrative example. While it is possible to use other kinds of basic sequence and to use other ways of transforming the numbers of the basic sequence to obtain new sequences, the added new dimension has several advantages as evidenced in the illustrative embodiment.

The permutation process as described is an example of a more general process of transformation that transforms a set of numbers into another set of numbers (that may differ in size). It should be apparent that although a transformation resulting in the permutation as described is advantageous, other transformations may be used to derive frequency-time pattern based on the described principle. It should also be apparent that in some implementations the order in which the shift and the second transformation (permutation) is performed may be reversed without altering the essence of the method.

Another advantage of the illustrative embodiment is that the permutations and shifting of the sequences can be performed by processing (transforming) one number of the sequence at the time, thus eliminating the need to store and manipulate the entire sequence. I.e., the permuted or shifted sequence numbers are produced one at the time as needed based on numbers from the basic sequence that are also produced one at the time as needed.

Note that this advantageous way of producing the frequencies does not require any overhead in the transmitted messages for the synchronization purpose. This is because the receiver can instantly recover the PN generator status based on just a single received message if the transmitter ID code is known. As described previously, the receiver can infer the status of the 8-bit generator based on the received frequency index and the transmitter ID code. I.e. the message contains the information about the 8-bit generator without explicit inclusion of the generator status bits in the message. In the illustrative embodiment, after the frequency index is obtained for a transmission, the time index is obtained by filling the shift register in the steps of storing the PN generator status, clocking the PN generator and shift register N times, and restoring PN generator status. This way, the content of the shift register 412 is not required by the receiver to obtain synchronization because the time index depends on the future content of the PN generator that can be easily duplicated in the receiver based on the present content. Therefore, the receiver can still synchronize with a transmitter based on one received message and the message does not need to include any overhead for synchronization.

In an alternative implementation, a second PN generator synchronized with the first PN generator may be used to produce the time variations wherein an information about the second generator phase may be included in the transmitted message to aid the synchronization. Equivalently, the receiver may compute the state of the second generator, based on the state of the first. Note, that synchronization of the first and the second generator in the transmitter is extremely important since the essence of the idea is that the cyclic shift of the second sequence is provided in respect to the reference provided by the phase of the first sequence. This way the resulting frequency-time hopping sequences produced in different transmitters are ensured to be distinct and orthogonal.

Although, the described implementation based on a single generator is advantageous since it results in a simpler implementation and lower overhead leading to a longer battery life, the two generator implementation can be modified to ensure low overhead and provide additional benefits as follows.

Both, first and second PN generators produce basic sequences whose length is $2^N$-1 and $2^M$-1, wherein N and M are the lengths of the respective shift registers in both generators. In order to provide for synchronization between both sequences, each sequence is extended by one bit by inserting one "0" bit at a predetermined place in the sequence. The advantageous place is after N-1 or M-1 "0" bits in the respective sequences. This way the lengths become $2^N$ and $2^M$ respectively which ensures that both sequence lengths are related by a power of 2 (i.e. 2, 4, 8, etc.). Now, it is possible to ensure that both sequences are always in the same phase relation; e.g. after initial reset, which sets the generators in a predetermined state, both generators are advanced at the same time. This way, they will return to the exact initial state after the full period of the longer sequence. Of the particular interest is the case of the time generator producing a longer sequence than the frequency generator. In some applications, there is a limited number of frequency channels available, however there is still a need to produce a large number of frequency-time orthogonal sequences. In such case, a longer time sequence can be used to expand the number of possible frequency-time sequences. For example if the frequency generator shift register has N bits and the time generator shift register has M bits, then the total number of sequences is $2^N*(2^M-1)*2^M$ as shown in the preceding examples. Each time M is increased by one, the number of frequency-time sequences is enlarged approximately by a factor of four resulting in a rapid increase of the number of sequences with the increase of the time generator shift register length. Also, the synchronization requires a small overhead because the receiver can infer the frequency generator state and needs only the state of the time generator. However, if the time generator is in precise phase lock with the frequency generator, the transmitter does not need to send the actual time generator state. Instead, the transmitter needs to include the information to remove the uncertainty created by the time sequence period being multiple of the frequency sequence period. E.g., if the time sequence is two times longer, the receiver needs to know if the time generator is in the first half or the second half of the sequence to determine the exact state of the time generator. In this particular case, this information requires only one bit to be included in the transmitted messages. Of course, more bits are required if the time sequence is longer, e.g. if the time sequence is 4 times longer than the frequency sequence, two bits are required; for 8 times longer sequence 3 bits are needed, etc.

The described method (with one or two generators) produce a large number of time-frequency orthogonal sequences in a simple and systematic way that enables the sequence selection by the transmitter ID and requires zero (or very small) overhead for synchronization. A system using a large number of time-frequency orthogonal sequences as described has an advantage of immunity to multipath fading, pulsed and frequency selective interference including intentional jamming, as well as low probability of self interference due to persistent collisions that may occur when two or more transmitters transmit messages on the same frequency and at the same time for a prolonged period. A large number of produced frequencies enables the manufacturer and the system operators not to be concerned with the management of sequences for all the transmitters. Instead, each manufactured transmitter can produce a unique sequence that can be easily replicated in the receiver based just on the transmitter ID code.

It is to be understood that the random frequency selection as described above and the time perturbation can be used together or in separation to achieve immunity to collisions. Such obtained frequency-time hopping sequence may be in any combination of time and frequency variability, including: (a) a fixed frequency pattern for all transmitters and individual time perturbation patterns for each transmitter, (b) a fixed time interval between transmission or fixed time perturbation pattern and individual pattern for frequency selection for each transmitter, and (c) individual frequency and time variations that can be combined to enhance the system performance at the expense of complication.

In the illustrative embodiment, both the transmission frequency and the time interval between transmissions are individually randomized for each transmitter by the transmitter ID code bits.

It is also to be understood that the illustrated method and its components such as generators, registers, gates, etc., can be realized in various forms of hardware some of which may include application specific integrated circuit (ASIC), or software, or their combination.

Figure 5:
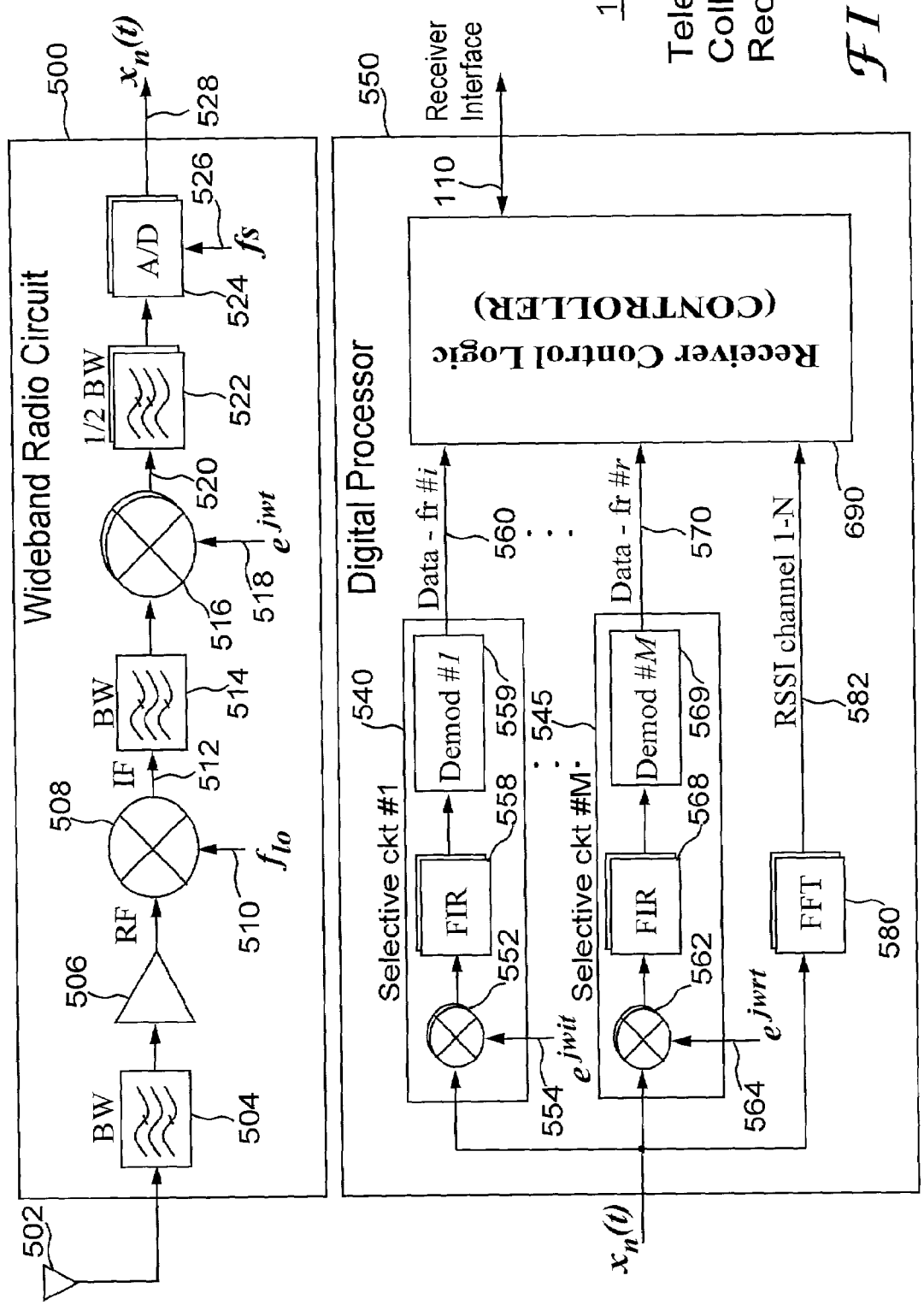
FIG. 5 is a block diagram of a receiver according to an advantageous embodiment of the present invention.

Referring to FIG. 5, according to an illustrative embodiment, the receiver includes a wide band radio circuit 500 with antenna 502 and a digital processor 550 with receiver interface 110. The wide band radio circuit 500 contains RF (radio frequency) bandpass filter 504 to select desired band of frequencies. The filtered signal is fed to a low noise amplifier 506 and further to the mixer 508. The mixer mixes the selected band of frequencies with the local oscillator frequency $f^{lo}$ 510. The resulting signal 512 is further filtered by IF (intermediate frequency) filter 514 having essentially the same bandwidth as the RF filter 504. The IF signal is fed to a complex mixer 516 to be mixed with complex signal $e^{jwt}$ 518. The resulting complex baseband signal 520 is filtered by a complex low pass filter 522 having bandwidth approximately half the bandwidth of the RF and IF band pass filters. Subsequently, the filtered signal is sampled by A/D converters 524 at the rate $fs$ chosen at least two times the Nyquist frequency of the sampled signal. Sampled complex signal $x_n(t)$ 528 is fed to the digital processor 550. The local oscillator frequencies 510 and 518 can be produced using any well-known methods such as a suitable frequency synthesizer. As describe, the receiver is wide band. I.e. it processes the entire band of interest that can contain a number of frequency channels, where each channel can carry a modulated frequency carrier.

The complex sampled signal $x_n(t)$ 528 is fed to logic 580 performing FFT (Fast Fourier Transform) of the sampled signal. The sampling rate $fs$ and the number of samples N taken for the FFT are related and conveniently chosen to obtain frequency resolution two times greater than the number of channels in the processed frequency band. The FFT output represents N frequency bins. Preferably, every other frequency bin of FFT is centered at the center of the transmission channels, and the alternative bins are centered between the transmission channels. This is accomplished by a preferred setting of the local oscillator frequencies $f_{lo}$ 510 and $e^{jwt}$ 518 in addition to proper choice of sampling frequency $fs$ and FFT length N.

In addition, gating and windowing is applied before FFT is performed although this operation is not shown in the drawing. The windowing function is to smooth out the signal at the edges of the N sample window. This is necessary to lower the common impairments in FFT processing, namely spectral leakage and spectral smearing.

Gating has a different purpose in the illustrative embodiment implementation. Normally, in signal processing, the FFT is performed on N samples and when finished, the next block of consecutive N samples are taken for processing, etc. In the illustrative embodiment, when one block of N samples is converted, the next K-1 blocks are ignored and K-th block of N samples is processed, etc. This way only every K-th block is processed by FFT. This serves the purpose of saving the amount of processing by a factor of K and results in a lower cost and lower power consumption.

In operation, the FFT performs periodic processing of the sampled signal and the resulting output 582 is fed to the controller 690 further processing the FFT output to determine the power of spectral component in each frequency bin. A sudden power change detected on one or more frequencies may indicate that a new message (or messages) is being transmitted. The transmitted messages have a message preamble included in them in order to allow the receiver to acquire and synchronize. The longer the preamble, the less often the receiver has to perform FFT processing (larger K factor), however, the longer the transmitted message, the more battery energy is drained. The number K is chosen judiciously as a trade off between the speed of acquisition and message length as desired for a specific system design.

The same signal $x_n(t)$ is fed to M frequency selective circuits in the digital processor 550. Only two frequency selective circuits are shown: circuit #1 540 and circuit #M 545, wherein circuit #1 consists of a complex mixer 552, a complex FIR low pass filter 558 and a demodulator 559, and circuit #M consists of a complex mixer 562, a complex FIR low pass filter 568 and a demodulator 569. The complex local oscillators signals $e^{jw_i t}$ 554 and $e^{jw_r t}$ 564 are designed using a technique commonly referred to as DDS (Direct Digital Synthesis), however in this case all the mixing is performed digitally and consequently, there is no need for a D/A converter to convert the digitally generated local oscillator signal into an analog signal as is commonly practiced with DDS. The resolution of the DDS oscillator is preferably chosen to be ¼ of the transmission channel spacing.

In operation, when the controller determines (in a way described above and further described in details below) that a transmission is taking place or is about to take place on frequency i, it directs one of the available frequency selective circuits to that frequency by appropriate programming of the DDS circuit. As shown in FIG. 5, circuit #1 540 is receiving frequency i, and circuit #M 545 is receiving frequency r. The FIR filters 558, 568 are narrow band multirate polyphase low pass filters. They have the same bandwidth that is related to the channel width and modulated carrier spectrum width and the resolution of the DDS synthesizer. I.e. the bandwidth is small enough to reject the adjacent channels but wide enough to pass most of the received modulated carrier spectrum. The demodulators 559 and 569 are conventional demodulators whose principle of operation and implementation depends on the modulation format used in the transmitters. In the illustrative embodiment, this operation is performed by a conventional DSP (Digital Signal Processor) that performs demodulation function for all circuits. The demodulated data of frequency i and r are sent to the receiver controller 690 via lines 560 and 570 respectively.

The number of circuits M is chosen depending on the desired system characteristics and the number of simultaneous receptions to be preformed.

Additional aspect of the implementation is related to the frequency drift of the transmitters and the frequency estimation for the local oscillators. Normally, the frequency drift of the transmitters can be quite large and comparable to the channel bandwidth. The receiver controller performs a frequency estimation of the detected signal using unique properties of the FFT. When FFT processes a signal containing a frequency component that is located between two frequency bins of the FFT, the power is shared between both bins, i.e., two FFT outputs indicate raise in detected power. The relative value of each output depends on the exact location of the carrier, and is higher when the carrier frequency is closer to the center of the frequency bin. Using this principle, the controller can estimate more precisely the carrier frequency and tune the DDS circuit appropriately ensuring that the signal is not attenuated or distorted by the FIR filter. The final frequency error compensation occurs in the demodulator in one of the conventional ways.

Finally, the signals detected by the receiver as described above is further processed by the controller that can take further action including sending messages as required via receiver interface 110.

It should be apparent that the FFT performs an improved function that is equivalent to the RSSI (Received Signal Strength Indictor) in conventional single channel receivers. The purpose of this improved multichannel RSSI is to easier and faster detect the transmitted carriers and obtain an acquisition and synchronization.

In some situations, no additional mechanism is required to receive the intermittent messages from a multiplicity of transmitters that are not synchronized with each other and that transmit short burst messages at variety of frequencies with long time intervals between the transmissions. In many cases, however, it is advantageous to maintain simultaneous synchronization with all the transmitters, as described later in details, in order to improve the reliability of the transmission in an environment that is heavily polluted with pulsing interference or very strong constant interference that may result in excessive spectral leakage and smearing of the FFT. If the time and frequency of the future transmission is separately computed and updated in the receiver, the receiver tunes one of the frequency selective circuits to appropriate frequency just prior to the transmission to be. Thus the interference occurring on other channels and other time can be ignored. The multichannel RSSI function is to assist the controller with obtaining initial synchronization and to reacquire synchronization with transmitters with whom the synchronization has been lost. In addition, the improved RSSI can aid the receiver in faster detection and response to the alarm messages that are transmitted at different (faster) time intervals than the usual supervisory messages. Also, the receiver with improved RSSI and equipped with tracking mechanism can perform we with fewer demodulators. In most practical situations, just one demodulator may be required, thus resulting in a simpler and less expensive receiver.

Figure 6:
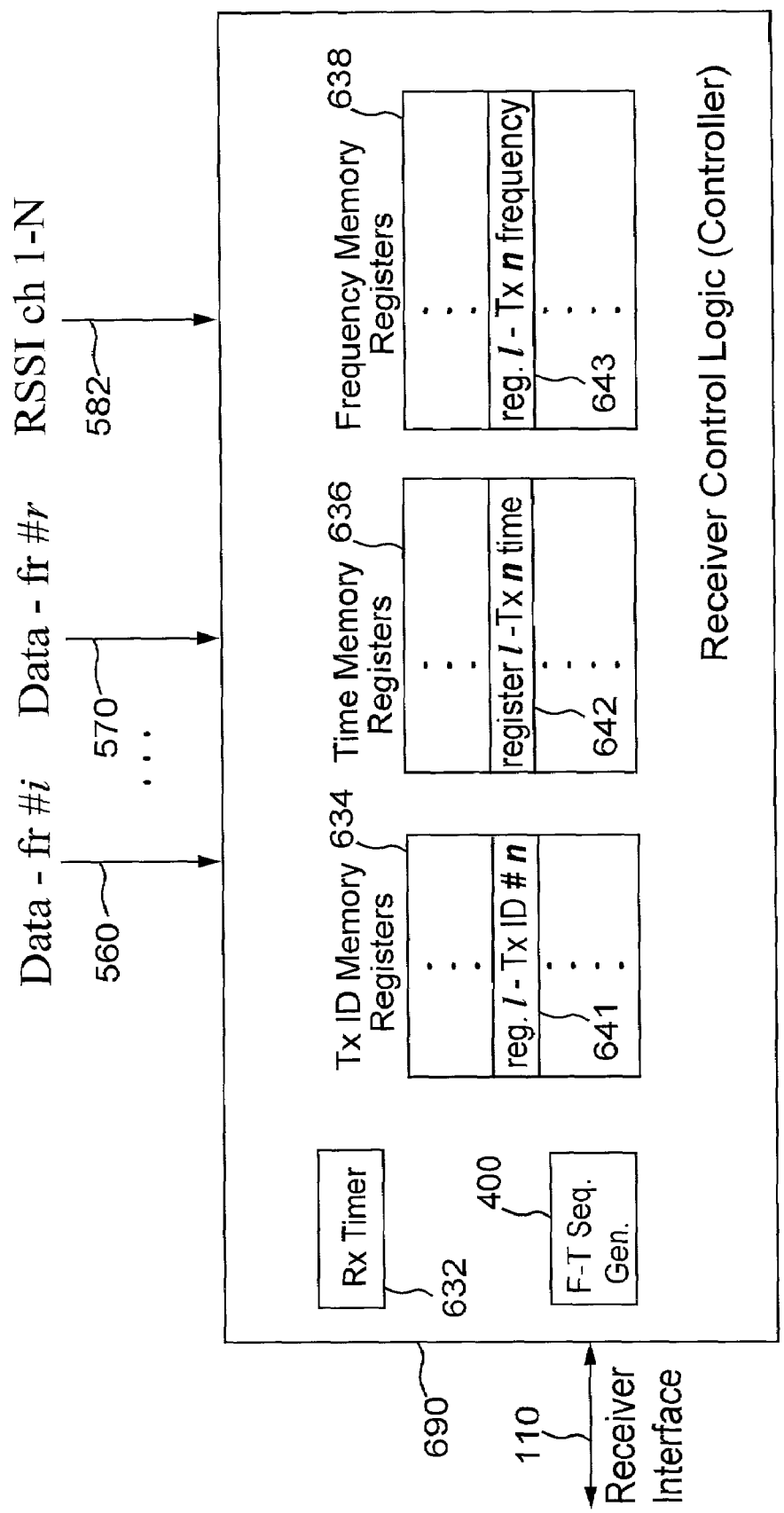
FIG. 6 is a block diagram of an example of an illustrative embodiment of a controller including hopping tracking mechanism.

FIG. 6 illustrates the tracking mechanism in the receiver according to the illustrative embodiment.

The control logic 690 includes: (a) a plurality of ID memory registers 634 to hold digital data indicative of ID numbers for each transmitter that belongs to the system, (b) a plurality of time memory registers 636 to hold digital data indicative of the time of the next transmission occurrence for each respective transmitter, and (c) a plurality of frequency memory registers 638 to hold digital data indicative of the frequency of the next transmission occurrence for each respective transmitter. The control logic 690 includes also receiver timer 632 and frequency-time sequence generator 400. In the illustrative embodiment, the registers are organized such that an arbitrary register 1 641 of the plurality of ID memory registers 634 associated with a transmitter whose ID number is n, is associated with register 1 642 of the plurality of time memory registers 636 and register 1 643 of plurality of frequency memory registers 638, wherein said registers 642 and 643 hold data associated with said transmitter n.

In the illustrative embodiment, the time registers 636 hold numbers—time of next transmission—for each transmitter representing the state of the receiver timer 632 at the time the next transmission is due from a transmitter.

In the illustrative embodiment, the frequency registers 638 hold, for all the transmitters, the state of the generator for producing frequency-time hopping sequences as previously described. If the synchronization is obtained with a given transmitter #n, the state the generator corresponding to that transmitter is identical with the generator in the transmitter #n.

In operation, the receiver control logic 690 sequentially compares the data content of the time registers 636 with the data content of the receiver timer 632 and if the transmission is due from a transmitter, the control logic programs the frequency selective radio receiver demodulator circuit by changing the local oscillator frequency 554 or 564 according to the data content in the frequency register 638 for this transmitter, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the packet was received successfully. The new content of the frequency register is determined according to the algorithm for the frequency use by the transmitters. This is accomplished by initializing the frequency-time sequence generator 400 included in the control logic 690 using the value stored in the frequency register, applying transmitter ID to the generator and clocking it to obtain the next frequency and time as described earlier.

The new content of the time register is calculated based on the current content of the receiver timer and a number representative of the time between the current transmission and the next transmission for this transmitter, wherein said number is calculated based on the nominal value of the time between the transmissions and adjusted by the pseudo random perturbation performed according to the previously described algorithm. In addition, said number is corrected by a correction factor based on the measured difference between the transmitter time base and the time base of the receiver, wherein said difference is determined in a manner described later in details. In the illustrative embodiment, the numbers representative of the time base differences are stored in the time registers 636 separately for each transmitter and are independent from the numbers representing the time of the next transmission, i.e. the time registers are split to hold two independent numbers.

It should be noted that even if crystal oscillators are used in the transmitters and the receiver to control the timing, the error accumulated during the time between transmissions may be significant compared to the transmission time. For example, if the period between the transmissions is 100 seconds and the crystal frequency error due to tolerance and temperature changes is +/−20 ppm (parts per million) for the transmitter and +/−10 ppm for the receiver, then the error may be as large as 3 ms. If the time for the transmission of one data packet (transmission) is 5 ms, then the error is significant. In order to minimize the time error accumulated during the long time between the transmissions, the receiver can store the time difference between the ideal and the actual time of reception and use the difference to predict more accurately the next transmission time. For example, if the timer resolution is 0.3 ms, then the next transmission time can be predicted with accuracy 0.3 ms, providing that the temperature does not change appreciably over 100 s period. This represents an improvement of an order of magnitude. I.e. the receiver can program its frequency 0.3 ms in advance to each new frequency, examine it for the duration of the transmission, then program to the next frequency and so on.

During the acquisition, when the time error is not known, the receiver needs to tune to the first frequency at least 3 ms in advance. If during the next 6 ms no valid signal is present, the receiver programs to the next frequency 6 ms in advance and so on. To alleviate this acquisition problem, the receiver includes a frequency error detection means as described below.

When a transmitted carrier is detected, the receiver measures the relative frequency error of the carrier. The receiver does it in two ways. First, the receiver uses FFT outputs to estimate coarse error as described above. Second, the receiver obtains the more precise the frequency error value from the demodulator based on the principle described below.

In the illustrative embodiment, the time base and the transmission frequency of a transmitter are derived from the same source. Likewise, the time base and receiver frequency of are derived from the same source in the receiver. Consequently, by knowing the frequency error between transmitter and receiver, the time base error can easily by calculated and compensated for.

For example if the transmitted carrier is 900 MHz and the measured frequency error is 9 kHz, the frequency references in the receiver and the transmitter are off by 10 ppm. Consequently, the time base is also off by 10 ppm. If the nominal value of time between transmissions is 100 s, then the timing error is 1 ms.

In the illustrative embodiment, the receiver compensates for the time base difference by adding or subtracting a correction value to the nominal value of the time between transmission. The correction value is obtained individually for each transmitter.

Also, the obtained frequency error is stored to be used during subsequent reception of the signal from this transmitter. The stored error value is used to initiate the demodulator to ease the demodulator synchronization process. This lowers the requirements for the length of the preamble included in each transmission for the purpose of carrier and data timing acquisition.

It should be stressed that in the illustrative embodiment of the receiver the time and frequency registers and the improved RSSI circuit work in harmony to obtain faster acquisition and better tracking. Although the receiver could operate with RSSI circuit alone or with the time and frequency registers based tracking apparatus alone, the combined action results in a more robust system and is therefore preferred.

In operation, the receiver scans all the available for transmission frequencies by monitoring the outputs of the FFT and by tuning the frequency selective circuits sequentially to all the available for transmission frequencies during the time when they are not occupied with the scheduled reception from the transmitters. This is especially important whenever the tracking apparatus loses synchronization with one or more transmitters. If a transmitted carrier is detected, then the receiver determines if the transmitted waveform parameters are valid by detecting the data pattern in the message or other unique properties of the modulated carrier. If the parameters are not valid, the receiver will quickly proceed to examine the next frequency. This way, the scan of all available frequencies is fast, thus the synchronization can be regained faster and more reliably because the receiver will not waste much of the time to examine very weak or spurious signals.

In addition to robust performance, the precise time and frequency tracking, as described in conjunction with the illustrative embodiment, provides a means for authenticating the received messages. In the illustrative embodiment, the transmissions are discriminated based on the expected and actual time and frequency of transmissions. I.e., if a transmission is received from a transmitter at a wrong frequency or at a wrong time, it may be declared invalid. Here, a wrong frequency is defined as inconsistent with the expected frequency based on present position of the hopping sequence as computed in the receiver, and wrong time is defined as inconsistent with the expected time as computed in the receiver. In addition, the expected time computation may include a time error window based on cumulative effect of the maximum anticipated time error due to relative time base difference between the transmitter and the receiver, as described earlier. Likewise, expected frequency may include the frequency error due to frequency reference difference and resulting difference between the transmitter and receiver frequencies, as described earlier. I.e., besides the hopping pattern there may be additional component, in frequency determination as well as the time determination, that results in a slight frequency offset and/or time offset that can be view as a sort of additional signature of a transmitter.

The problem is that an attack can be constructed based on recording and playback of the transmitted messages. Normally, this is difficult because of the use of the frequency-time hoping, which, in addition, is different for each transmitter. Normally, the transmitted messages do not change often and even if they do, the receiver cannot verify if the change is introduced in the transmitter. In addition, if the transmitter ID is included in the transmissions and can be transparently received, it makes it easier for an attacker to determine the hopping pattern. Thus, in theory, it may be possible, although with difficulty, to record and play back transmissions (necessarily, at the right frequency and the right time) with the purpose of confusing the system receiver. The illustrative embodiment provides for further improvement of the system security.

In the illustrative embodiment, there is provided an additional method for authenticating the received messages, which works in conjunction with the previously described method of discriminating the transmissions. Accordingly, the transmissions are encrypted, wherein the encryption key is varied for each transmission. The encryption key is varied based on the state of the frequency-time hopping generator. In the illustrative embodiment, the sequence of the encryption key changes is selected based on the transmitter ID and is different for each transmitter. In addition, the sequence is depended on a status of a counter (implemented in the transmitter control logic), whose value is incremented each time the frequency-time hopping generator rolls over, i.e. once per the generator's period.

In the illustrative embodiment, there is provided an additional method for authenticating the received messages, which works in conjunction with the previously described method of discriminating the transmissions. Accordingly, predetermined bits of data for transmission are modified by a modifier. The modifier is based on the state of the frequency-time hopping generator. In the illustrative embodiment, the modifier is used to modify bits of the transmitter ID (or its portion) included in the transmitted messages. The ID is known by the receiver. In addition, the modifier is used to modify bits of a counter value that are included in the transmitted messages. The counter (implemented in the transmitter control logic) is incremented each time the frequency-time hopping generator rolls over, i.e. once per the generator's period. In the illustrative embodiment, the modified data for transmission is further encrypted prior to transmission.

Figure 7:
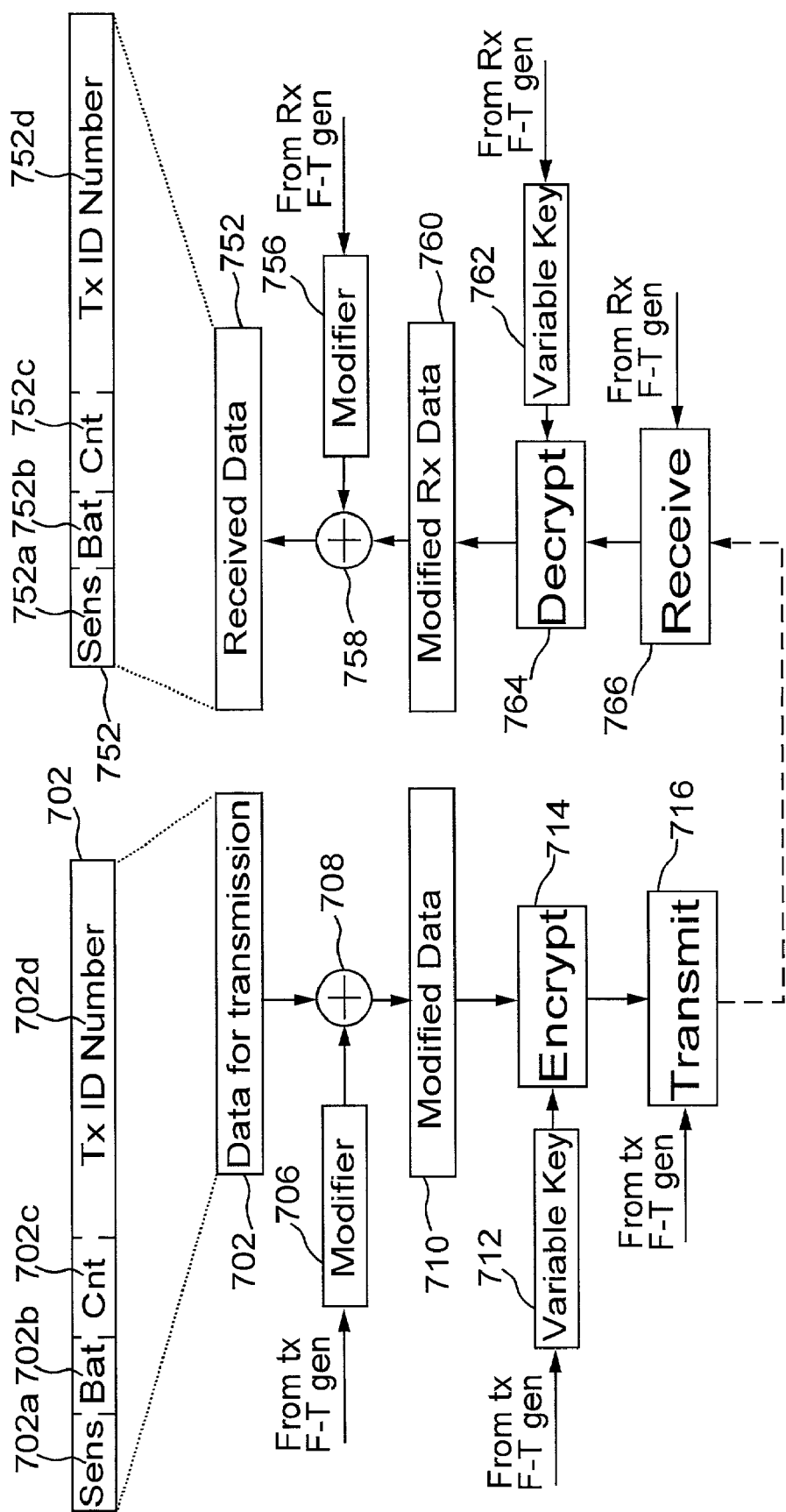
FIG. 7 is block diagram of an example of an illustrative embodiment of a authentication process.

Referring to FIG. 7, in the transmitter, data for transmission 702 comprises several fields including sensor status 702a, battery status 702b, counter value 702c and transmitter ID 702d. Selected bits of data for transmission 702 are modified by modifier 706 using bitwise EX-OR operation 708 resulting in modified data 710. In the illustrative embodiment, the bits selected for modification include some or all bits of the transmitter ID 702d. The modified data is further encrypted and transmitted by the transmission process 716. The transmission process uses the frequency-time hopping as previously described.

Modifier 706 is determined based on the state of the frequency-time hopping generator based on the method of generating frequency-time hopping sequences as described previously. This can be done, for example, by retrieving modifiers from a look-up table based on the generator state or by computing the modifier based on the state of the generator according to a predetermined algorithm. I.e., in the illustrative embodiment, the modifier is changed with each transmission and the sequence of changes is different for each transmitter. Counter value 702c is incremented periodically with a period equal to the period of the frequency-time hoping generator. The increment is applied each time the time-frequency hoping generator rolls over a predefined state. The use of the modifier, as described, ensures that the data for transmission varies for each transmission, and that the variations can be (1) undone and (2) verified in the receiver. This can be used in the receiver for the purpose of authentication. The use of the counter is beneficial if the frequency-time hopping generator is relatively short. In such case, without the counter, the data for transmission is allowed to repeat periodically with a period equal to the generator period, thus the system may be spoofed (although with considerable difficulty) by recording and playing back a transmission at the right frequency and the right time. Of course, the receiver logic needs to track counter changes for each transmitter, this, however, is easy since the change is only once per the hopping sequence period.

Other methods of ensuring verifiable variability of the data for transmission may be designed, however the method used in the illustrative embodiment is simple and efficient and requires little overhead in the transmission. Furthermore, the receiver can easily synchronize with the changes but only if the change method is known and the transmitter ID is known.

To prevent the transmitted data to be read and analyzed by unauthorized persons, for example, in order to discover the transmitter ID or to read the telemetry data, the transmissions are encrypted. In the illustrative embodiment, modified data 710 is encrypted by encryption algorithm 714 using variable encryption key 712. The specific choice of the encryption algorithm depends on the tradeoff between the computational complexity and the desired protection. The variable key is determined based on the state of the time-frequency hopping generator, for example by retrieving keys from a look-up table based on the generator state or by computing the key based on the state of the generator according to a predetermined algorithm. In the illustrative embodiment, the key is varied for each transmission and the sequence of variations is based on the transmission ID and is different for each transmitter. This way of determining the variable encryption key has the advantage that the receiver can easily synchronize with the changes but only if the change method is known and the transmitter ID is known. In the illustrative embodiment, the key variation is also depended on the counter value 702c. This way, the period of changes can be arbitrarily increased if the time-frequency sequence generator period is not sufficient.

During the initial synchronization, the receiver needs to try different values for the counter to generate the decryption key until successful. Subsequently, the receiver can replicate the counter value and increment it synchronously with a transmitter. Of course, the receiver logic needs to track the counter changes for each transmitter.

In the illustrative embodiment, the receiver is equipped with a list of ID numbers for all transmitters from which the receiver is supposed to receive transmissions. During initial synchronization e.g. after transmitter or receiver power up, the receiver must try each transmitter ID number to synchronize with frequency-time generator. When this is accomplished, synchronization with key variations or modifier variations is simultaneously obtained "for free" since these variations are based on the state of the frequency-time generator.

Note, that using different hopping frequencies for each transmitter is also beneficial for the initial synchronization process. For example, if two transmitters are added to the system and powered up, when the receiver receives a portion of a transmission, it does not know from which transmitter the transmission has been sent. The receiver can compute the next time and frequency based on both transmitter IDs. The receiver can then attempt reception at both frequency-time coordinates, which are different since the sequences are orthogonal. This concept can be of course extended to an arbitrary number of transmitters.

Referring again to FIG. 7, in an illustrative embodiment, in operation, the receiver receives the transmissions using receive process 766 utilizing time-frequency hopping as previously described. Subsequently, the receiver decrypts the received transmissions using decryption algorithm 764, which utilizes receiver variable key 762. Receiver variable key 762 is produced in a way that is analogous to that of the transmitter's. The decryption results in modified received data 760 that is subsequently modified by the bitwise EX-OR operation 758 using receiver modifier 756. Modifier 756 is produced in a way that is analogous to that of the transmitter's. If the receiver modifier and the receiver variable key are right, the end result is the received data 752 comprising received sensor status 752a, received battery status 752b, received counter status 752c, and received transmitter ID 752d.

The receiver can then validate the received massage by checking the received transmitter ID for consistency. Similarly, and in addition, if used and included in the transmission, the received counter status can be also checked for consistency.

Note that numerous variations may be possible using the described methods. For example, in one embodiment, the modifier may be varied as described, while the encryption key is constant. In another embodiment, the modifier may be constant or even eliminated, while the encryption key is varied as described. In yet another embodiment, the data field 702c, comprising bits of a counter value, is extended to include bits related to the frequency-time pattern generator state. For example, if the counter has eight bits and the pattern generator has eight bits, there are 16 bits in the field 702c, and a value represented by all bits of the field 702c is changing with each transmission. In this case, a constant encryption key can be used and the modifier can be eliminated. The constant variable key can be the same for all the transmitters or, advantageously, it can be different for each transmitter. Of course, in each case the receiver operation should match the operation of the transmitters.

The described method of authentication protects the system from fraudulent activities including sending a previously recorder valid message from a valid transmitter in order to confuse the receiver.

Although illustrative embodiments of the invention have been described in detail herein with reference to the accompanying drawings, it is to be understood that the above-described embodiments are merely illustrative of the invention, and that the invention is not limited to those precise embodiments, and that many variations may be devised by one skilled in the art without departing from the scope and spirit of the invention. It is therefore intended that such variations be included within the scope of the invention as defined by the appended claims.

What is claimed is:

1. A method of authentication in a telemetry system, said method comprising:

transmitting, by each of a plurality of transmitters, transmissions intermittently at time intervals and at a plurality of frequencies independently of any receiver of said transmissions and independently of any other of said plurality of transmitters, and holding, by a receiver, simultaneously for each of said plurality of transmitters, data indicative of an expected frequency and an expected time of at least one future transmission, and authenticating transmissions based on an expected and actual transmission frequency and time.

2. The method of claim 1 wherein said expected transmission frequency comprises estimate for transmitter reference frequency drift.

3. The method of claim 1 wherein said expected transmission time comprises estimate for transmitter time reference drift.

4. The method of claim 3 wherein each of said plurality of transmitters controls transmission frequency and time between transmissions based on frequency-time pattern that is different for each of said plurality of transmissions.

5. The method of claim 1 wherein, each of said plurality of transmitters is for varying encryption key between transmissions.

6. The method of claim 5 wherein said encryption key is varied based on frequency-time pattern for controlling transmission frequency and time between transmissions.

7. The method of claim 1 wherein each of said plurality of transmitters is for controlling transmission frequency and time between transmissions.

8. A receiver for authenticating telemetry transmissions, said receiver comprising:

logic for holding, simultaneously for each plurality of transmissions, data indicative of an expected time and an expected frequency of at least one future transmission, wherein each said plurality of transmissions is transmitted by a different one of a plurality of transmitters, wherein each of said plurality of transmitters is for transmitting transmissions intermittently at time intervals and at a plurality of frequencies independently of any equipment that is capable of receiving any of said transmissions from any of said plurality of transmitters, and circuitry for receiving said transmissions;

wherein said receiver is for authenticating transmissions based on an expected and actual transmission frequency and time.

9. The receiver of claim 8 wherein said expected transmission frequency comprises estimate for transmitter reference frequency drift.

10. The receiver of claim 8 wherein said expected transmission time comprises estimate for transmitter time reference drift.

11. The receiver of claim 8 wherein frequency and time of transmissions is controlled according to a frequency-time pattern that is different for each of said plurality of transmitters.

12. The receiver of claim 8 wherein said receiver is for changing decryption key between transmissions based on a frequency-time pattern for controlling frequency and time of transmissions.

13. The receiver of claim 8 wherein said receiver in operation authenticates transmissions based on verifiable and variable modification of transmission content.

14. The receiver of claim 13 wherein said verifiable modification is based on frequency-time pattern for controlling transmission frequency and time.

15. A frequency hopping telemetry transmitter comprising:

circuit for transmitting transmissions intermittently, at time intervals and at various frequencies, independently of any receiver of said transmissions, and logic for providing a predetermined frequency-time pattern for controlling transmission frequency and time between transmissions, and wherein said transmitter is for varying encryption, for said transmissions, based at least in part, on said frequency-time pattern.

16. The transmitter of claim 15 wherein said frequency-time pattern is predetermined based on a transmitter identification.

17. The transmitter of claim 15 wherein said frequency-time pattern is predetermined based on a transmitter identification.

18. A frequency hopping telemetry transmitter comprising:

circuit for transmitting transmissions intermittently, at time intervals and at various frequencies, independently of any receiver of said transmissions, and logic for providing a predetermined frequency-time pattern for controlling transmission frequency and time between transmissions, and wherein said transmitter is for modification of at least a portion of known data for transmission using a modifier that is varied based, at least in part, on said frequency-time pattern.

19. The transmitter of claim 18 wherein frequency-time pattern is individually selected for said transmitter from a plurality of predetermined patterns.

20. The transmitter of claim 18 wherein said frequency-time pattern is predetermined based on a transmitter identification.

* * * * *